No. 126,387. Patented May 7, 1872. 12 Sheets--Sheet 1.

John F. Foss's Improvements in Card Stripping Machinery.

Witnesses:
John E. Crane
Channing Whitaker.

Inventor.
John F. Foss

12 Sheets--Sheet 5.

John F. Foss's Improvements in
Card Stripping Machinery

No. 126,387.
Patented May 7, 1872.

Witnesses.
John E Crane
Channing Whitaker

Inventor.
John F. Foss

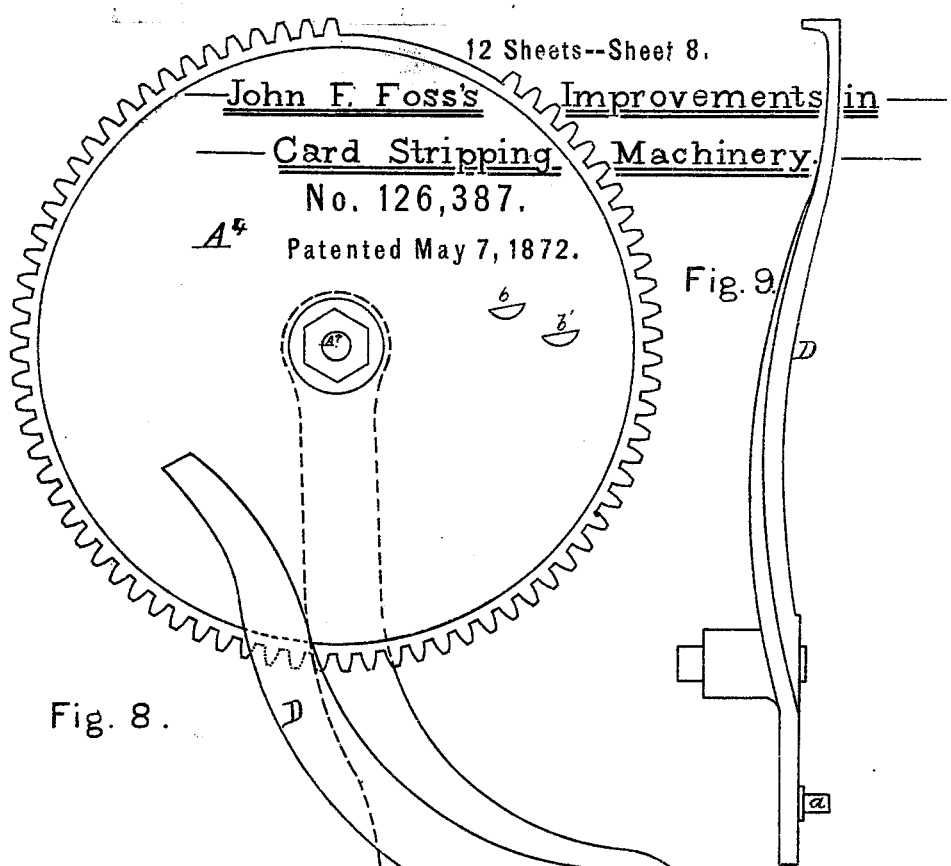
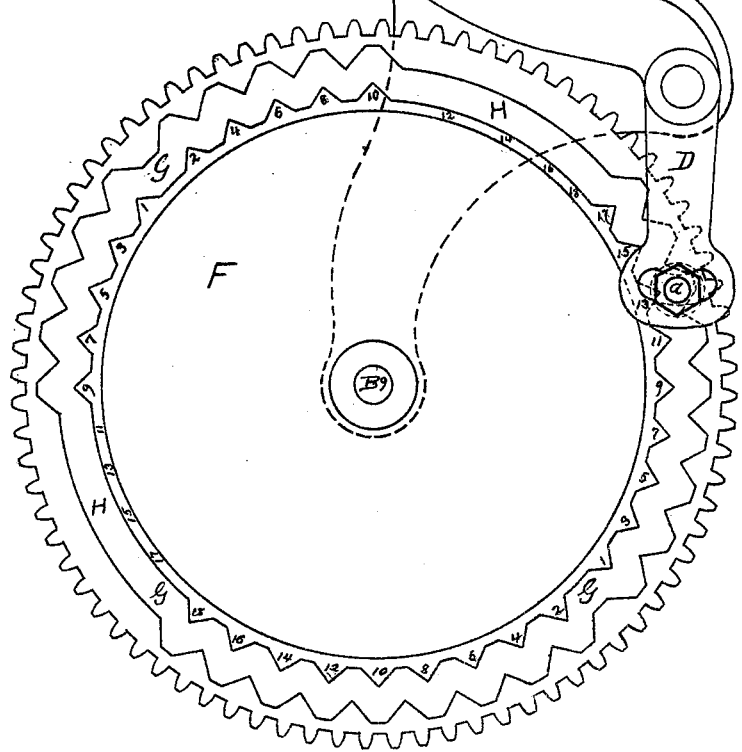
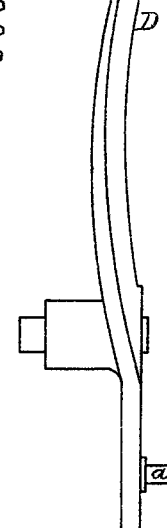
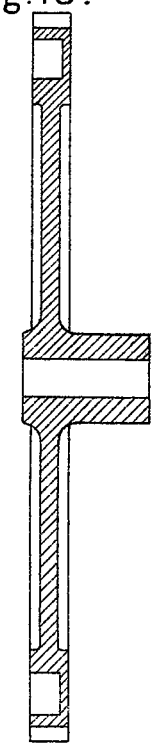
12 Sheets--Sheet 8.
John F. Foss's Improvements in Card Stripping Machinery.
No. 126,387. Patented May 7, 1872.
Fig. 8.
Fig. 9.
Fig. 10.
Witnesses.
John E. Crane
Channing Whitaker
Inventor
John F. Foss No. 126,387. Patented May 7, 1872. 12 Sheets--Sheet 9.
John F. Foss's Improvements in Card Stripping Machinery.
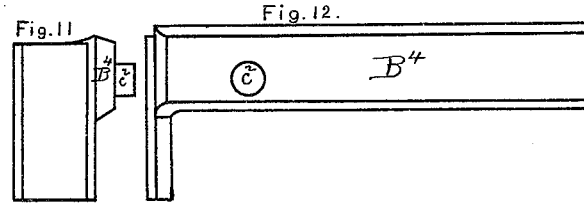
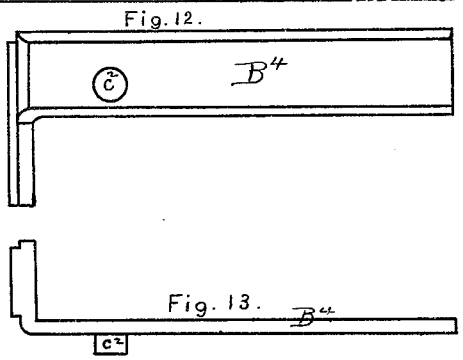
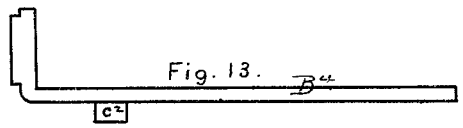
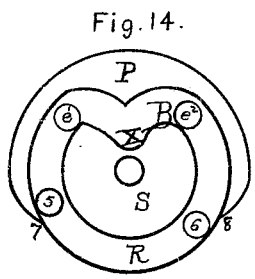
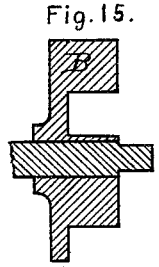
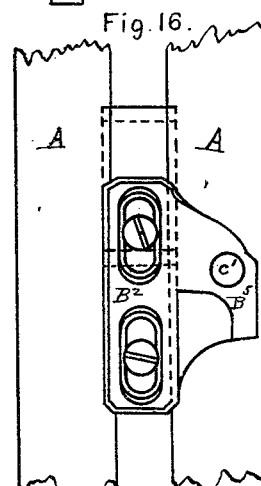
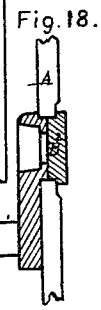
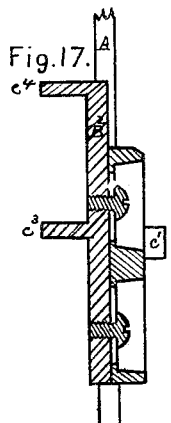
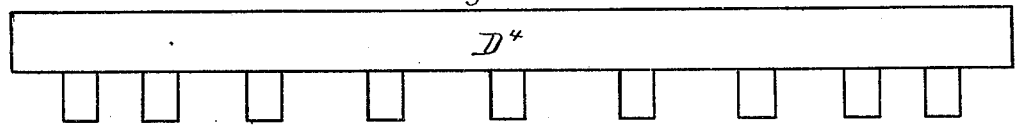
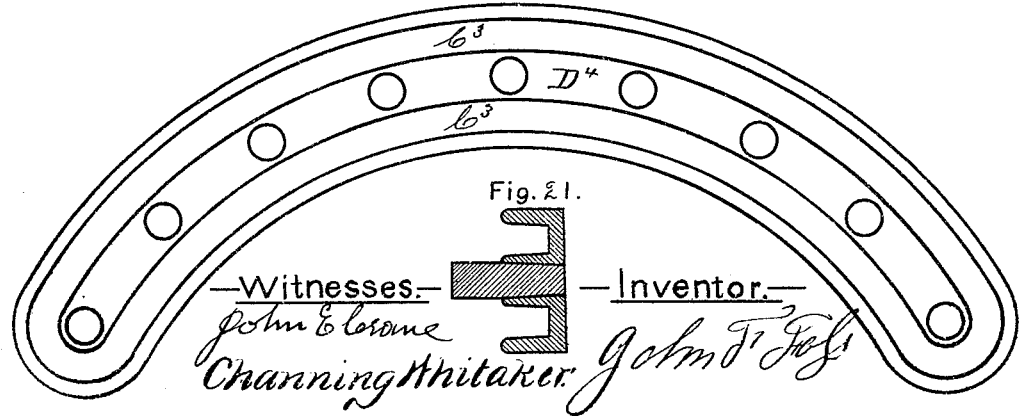
Witnesses. John E. Crane. Channing Whitaker. Inventor. John F. Foss.

No. 126,387. Patented May 7, 1872. 12 Sheets--Sheet 10.

John F. Foss's Improvements in Card Stripping Machinery.

Witnesses. John E. Crane. Channing Whitaker.

Inventor. John F. Foss.

No. 126,387. Patented May 7, 1872. 12 Sheets--Sheet 11.

John F. Foss's Improvements in Card Stripping Machinery.

Witnesses.
John E Crane
Channing Whitaker

Inventor.
John F. Foss 126,387

UNITED STATES PATENT OFFICE.

JOHN F. FOSS, OF LOWELL, MASSACHUSETTS, ASSIGNOR TO HIMSELF AND JOHN N. PIERCE, OF SAME PLACE.

IMPROVEMENT IN CARD-STRIPPING MACHINERY.

Specification forming part of Letters Patent No. 126,387, dated May 7, 1872.

*To all whom it may concern:*

Be it known that I, JOHN F. FOSS, of Lowell, in the county of Middlesex and State of Massachusetts, have invented certain new and useful Improvements in Card-Stripping Machinery, of which the following is a full, clear, and exact description, reference being had to the accompanying drawing making part of this specification, in which—

Figure 1:
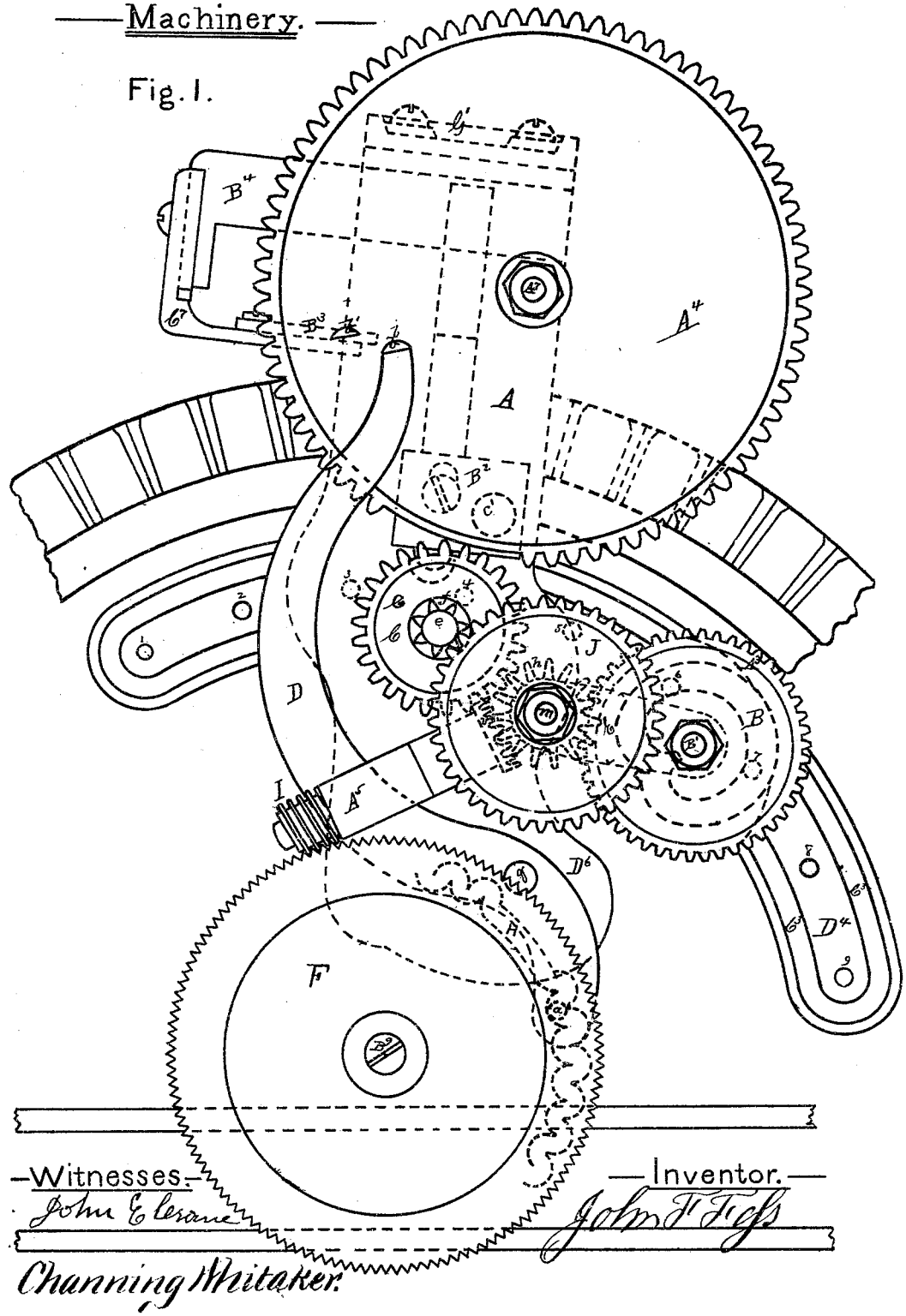
Figure 2:
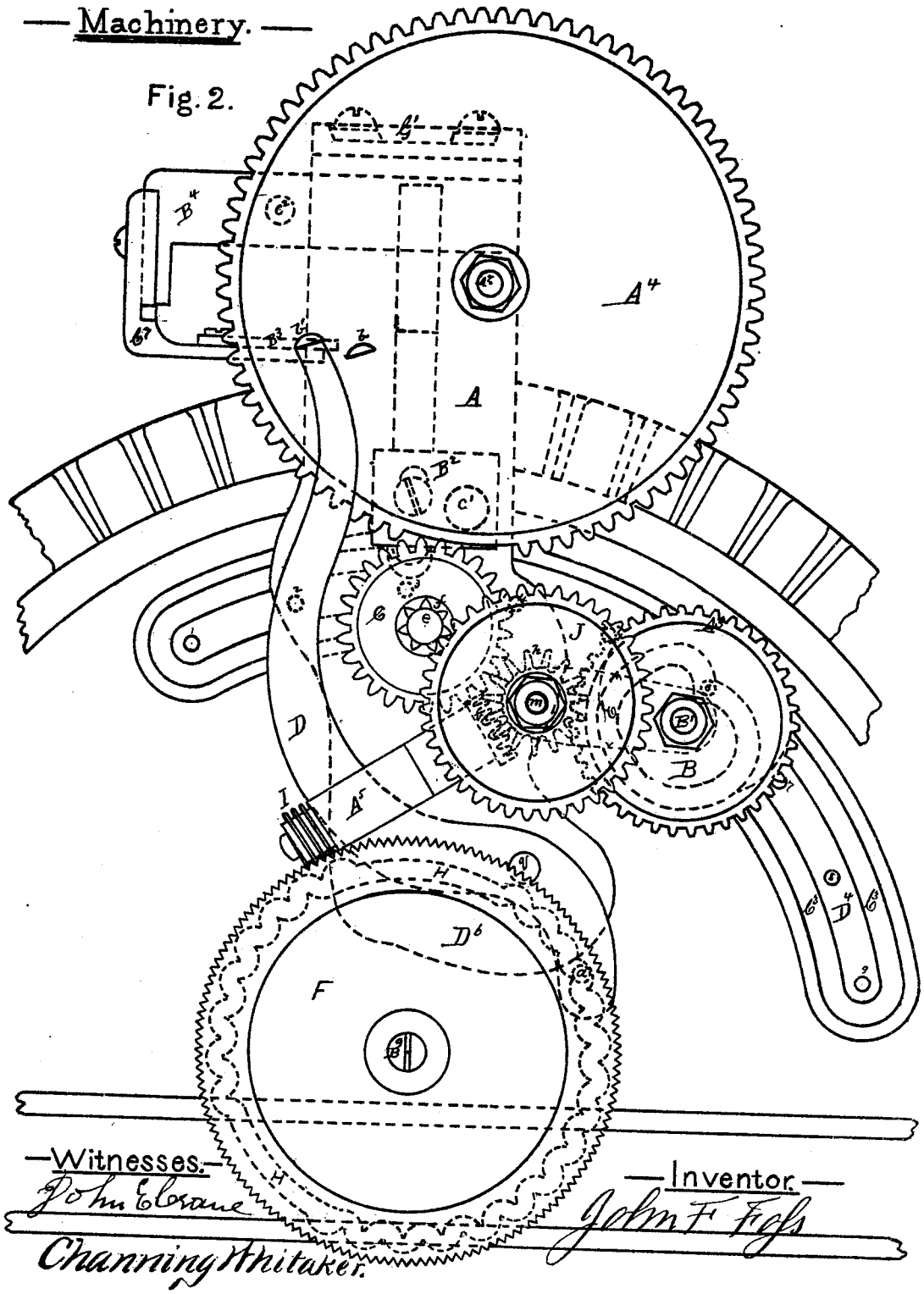
Figure 3:
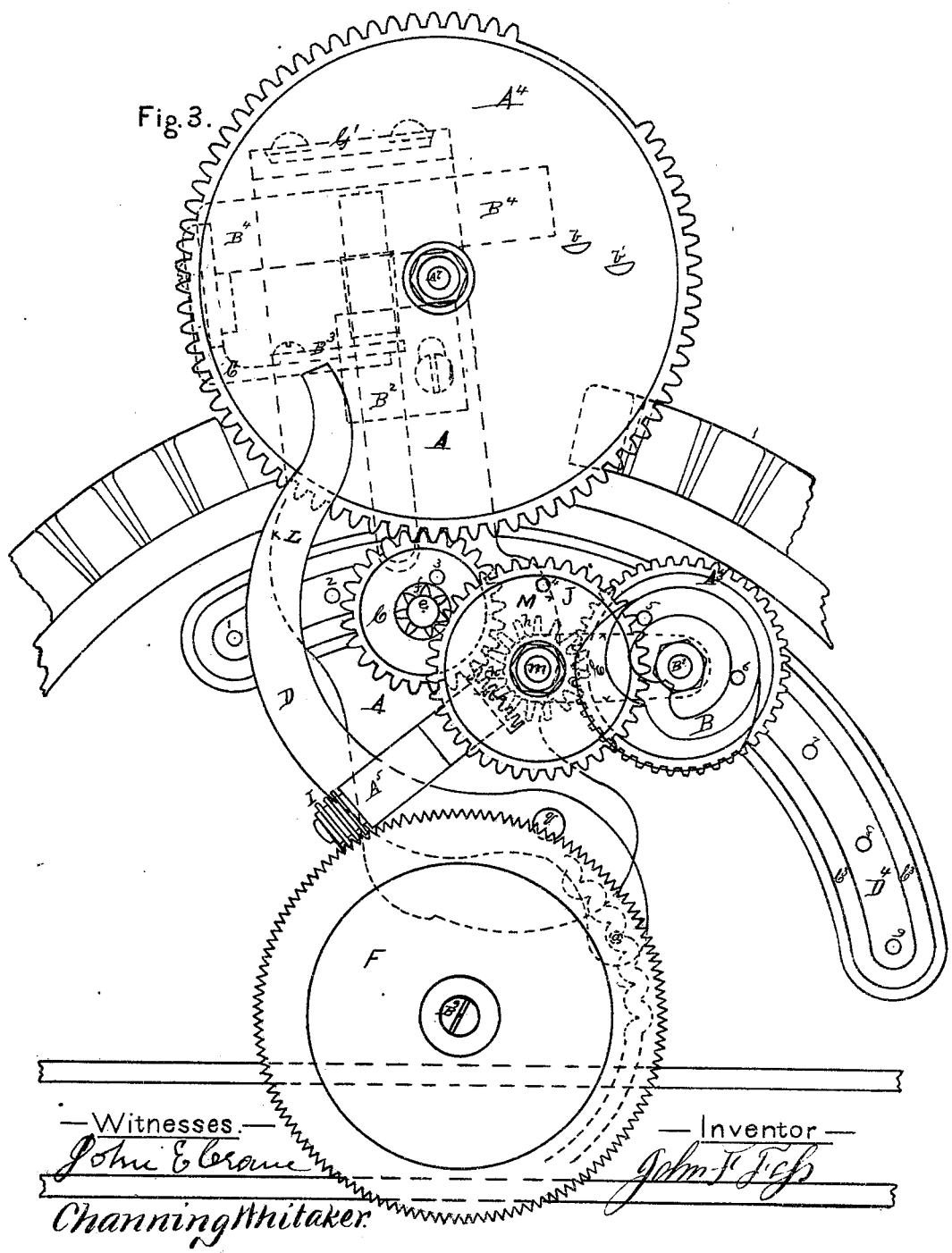
Figure 4:
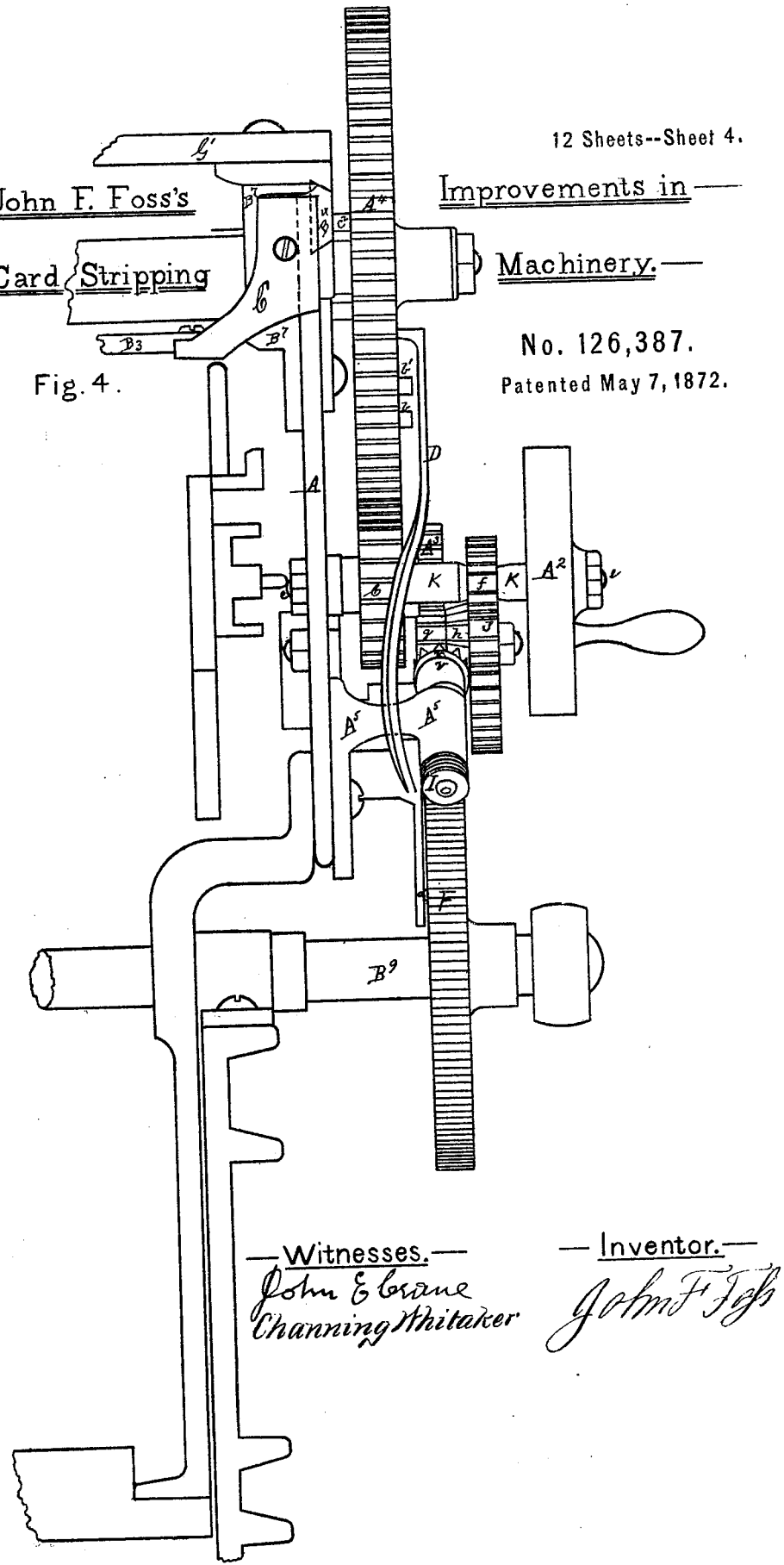
Figure 5:
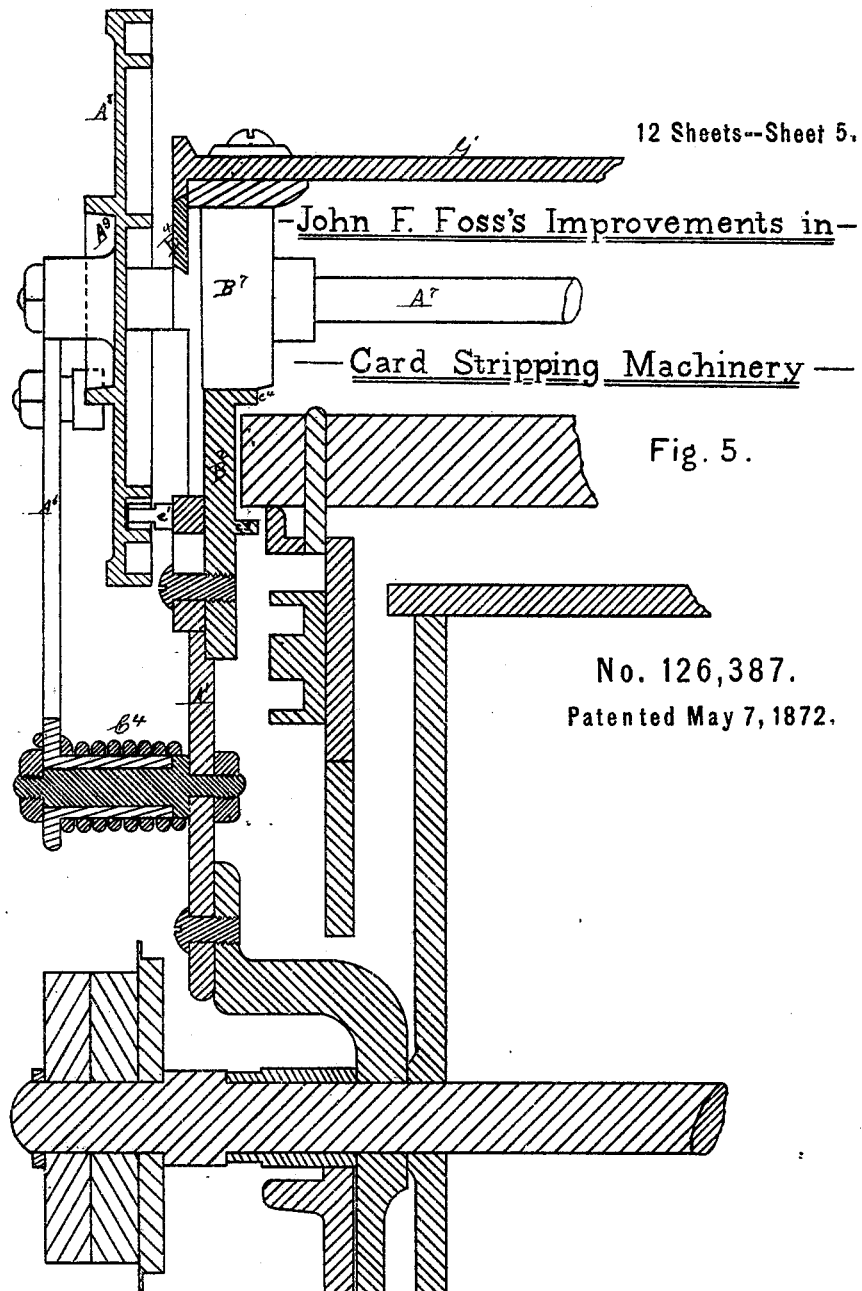
Figure 6:
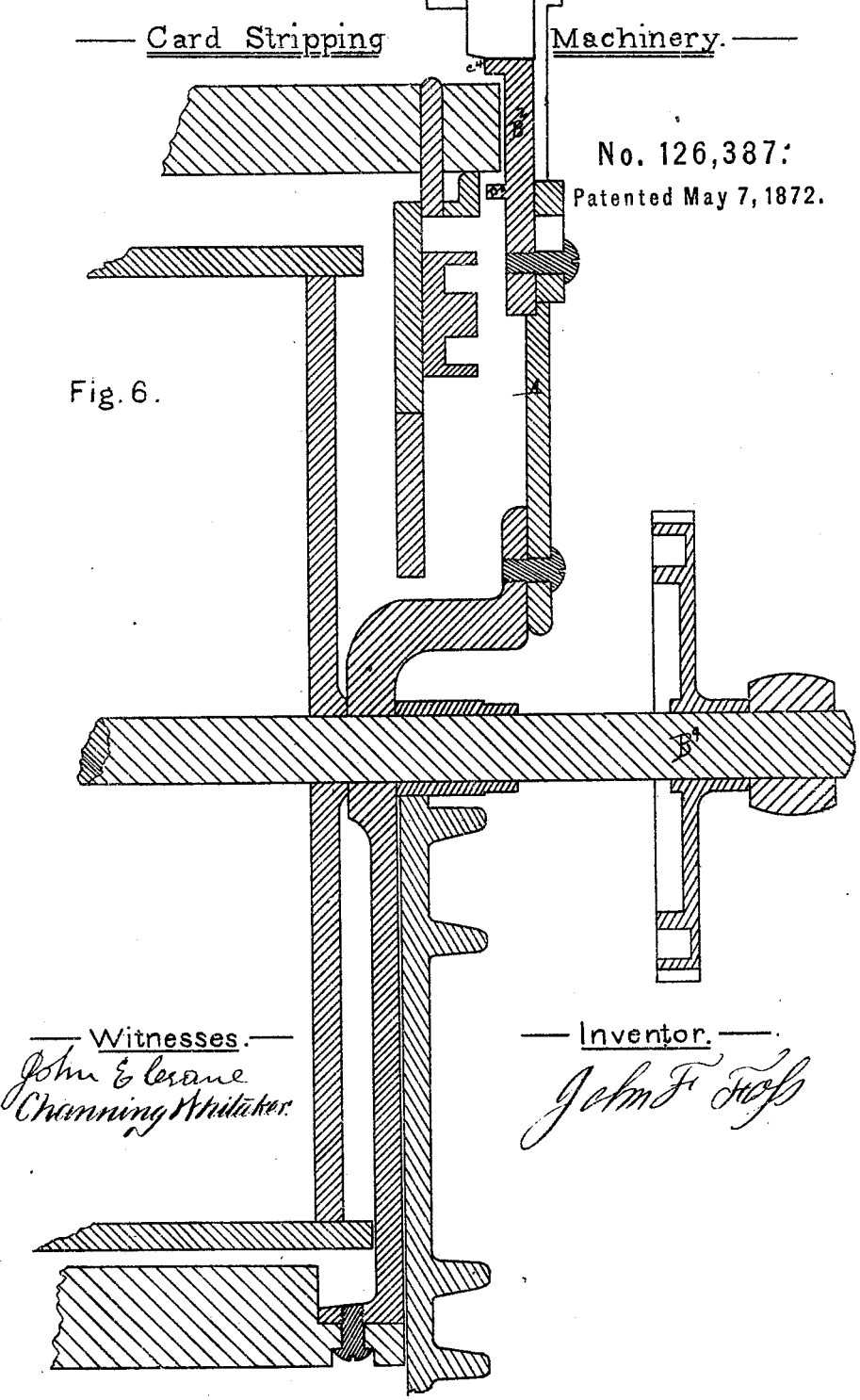

Figures 1, 2, and 3 represent each an end elevation of that portion of the card containing my improvements, and of that end which I call the head end of the card, being the operating end, or that which carries the principal operating mechanisms, each of the figures representing said operating parts in a different relative position. Fig. 4 represents a front or feed-roll side elevation of that end of the card shown in Figs. 1, 2, and 3. Figs. 5 and 6, taken together, represent a central longitudinal section, the former of the tail end, or main cylinder driving end, and the latter of the head end, or that end to which I apply the principal operating mechanisms, which are clearly shown in Figs. 4 and 7, and in detached details on Sheets 8, 9, and 10, Fig. 7 being a cross-section a little inside of the head-strip cam $A^4$. Fig. 8 represents an outer end elevation of the lifting and stripping cam, the trip-lever and the skip-wheel, and the stand or arm which connects them, the skip-wheel being shown as reversed or turned to bring the endless mangle-slot on the outside instead of on the inside, as shown in Figs. 1, 2, and 3, being capable of application, and successful operation in either position. Fig. 9 represents a side view of the trip-lever detached. Fig. 10 represents a sectional elevation of the skip-wheel.

On Sheet 9, Figs. 11, 12, and 13 represent, respectively, an end, a side, and an edge view of the adjustable strip-slide. Fig. 14 represents the operating end of the traversing or transfer cam used on only one end of the card, and Fig. 15 represents a central section of the last-named cam. Fig. 16 represents an outside view of the top-raising slide and a portion of the arm which forms a prominent part of the stripper-carrying frame shown in my former invention, and patented May 23, 1871. Fig. 17 is a longitudinal section, and Fig. 18 a transverse section, of the parts shown in Fig. 16. Fig. 19 shows an edge view, and Fig 20 an outside elevation, and Fig. 21 a cross-section, of the mangle-pin segment or the cam-connecting and traversing device peculiar in my invention, and used in connection with the transfer-cam, and not with a gear or pinion, as in other card-stripping machinery; said segment and cam being used on only one end of the card, and constituting a single traversing mechanism, thus avoiding all the usual double set-plates pinions, and one set of traversing mechanisms, and the cross-shaft which connects and operates the same, the transfer-cam and segment, as connected and operated together, with other improvements, all clearly shown in Figs. 1, 2, 3, and 7. Some of the parts in Fig 3—viz., the transfer-cam and the small gears in front of the segment—are intended to be shown in transparent elevations to show more clearly the segment and its pins behind them, and the position of the cams between two pins, as when holding the stripper-carrying frame at rest, while the cross-shaft and the two stripping-cams applied to the opposite ends thereof perform one revolution, and raise a top flat, insert and withdraw the strip-card, and replace the top on the arches.

Figures 22, 23:
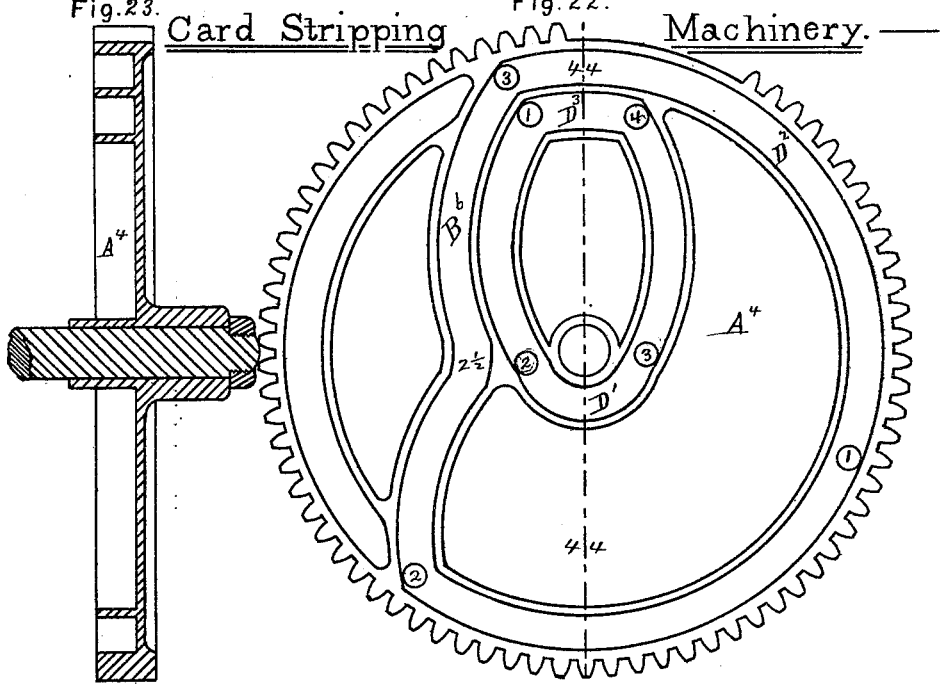
Figures 24, 25:
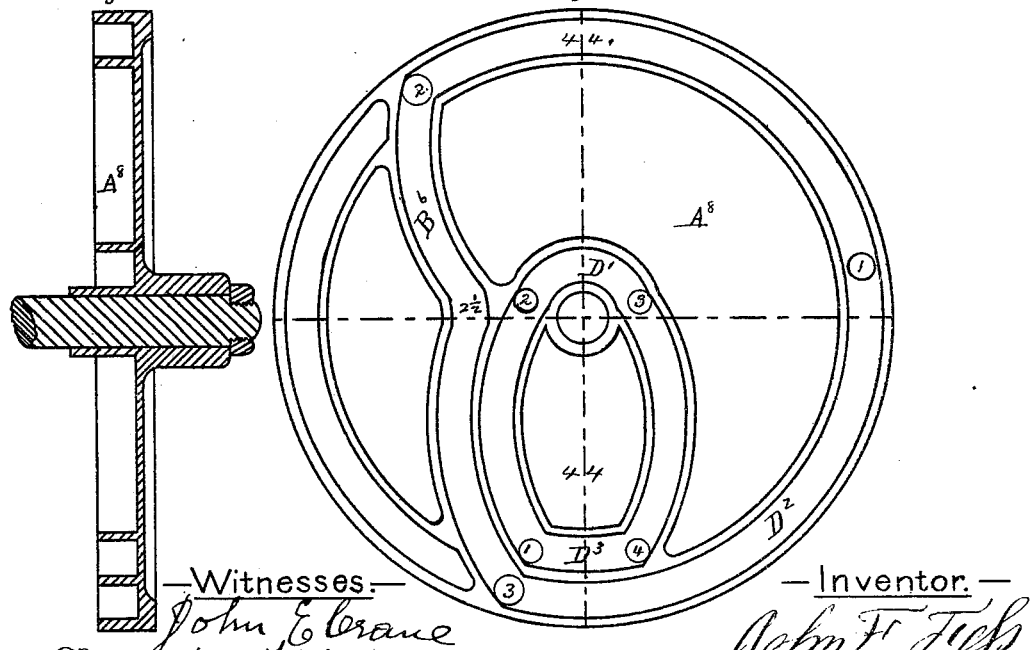
Figure 26:
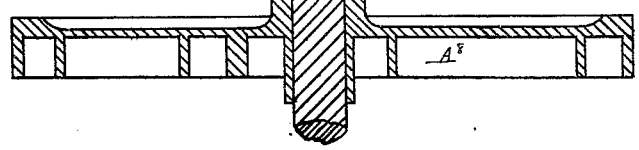

On Sheet 10, Fig. 22 represents the operating end or side of the stripper-cam employed on the head end of the card, being provided with teeth on its periphery, by which it is driven from an operating pinion on the shaft of the pulley which drives both the traversing and the stripping mechanisms. Fig. 23 is a central section of the cam last described. Fig. 24 represents the operating end or side of the stripper-cam employed on the tail end of the card, being the mate to the cam on the head end, and with no gear-teeth on its periphery, the head-end cam giving motion to the latter by the cross shaft $A^7$. Figs. 25 and 26 are opposite central sections of the cam last described.

Figure 27:
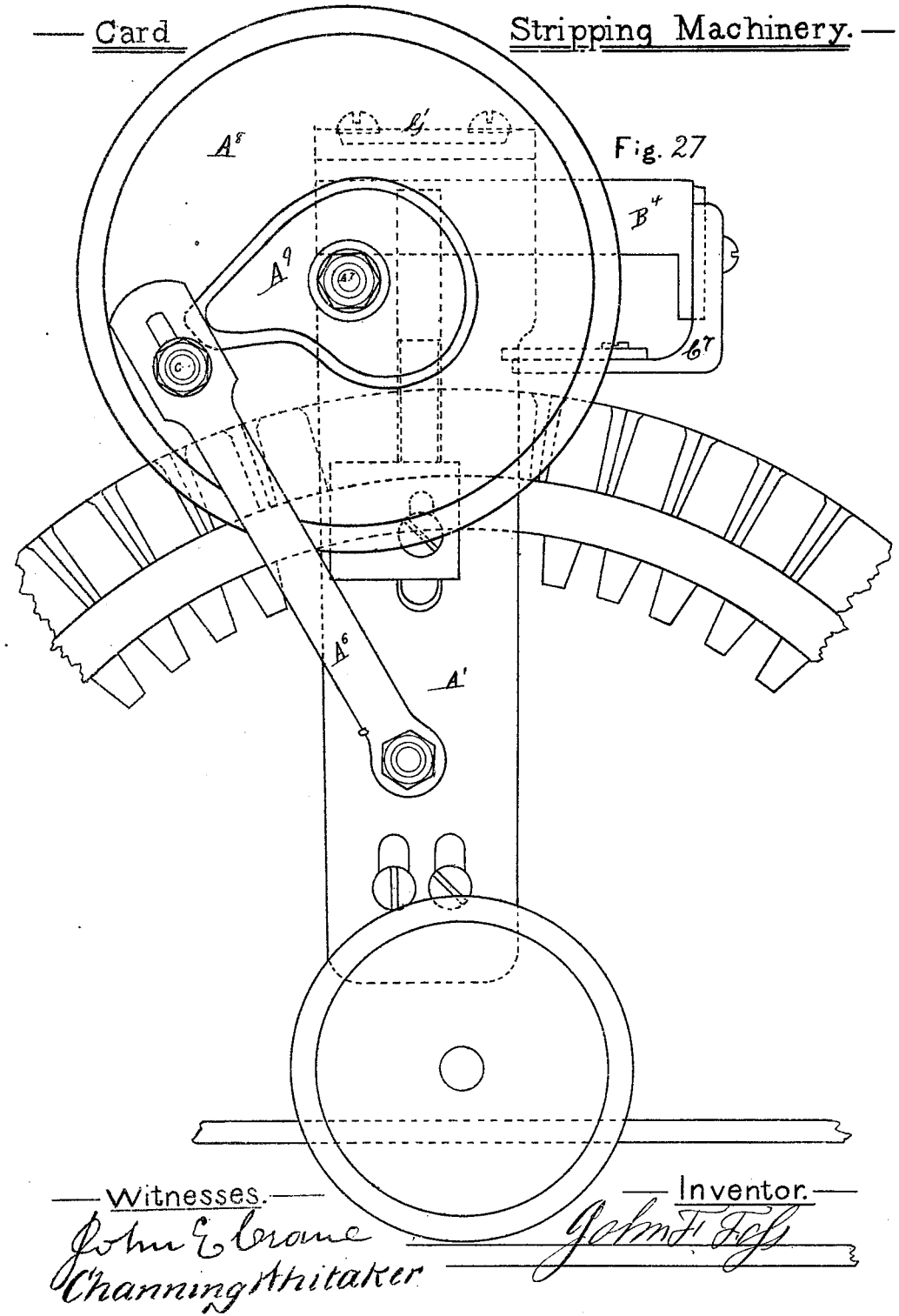

On Sheet 11, Fig. 27 represents an end elevation of a portion of the tail end of the card showing the outer end or side of the tail stripper-cam $A^8$ with its incline cam $A^9$, and spring-actuated lever $A^6$ in position to cause an intersection of the teeth on the gear of the head stripping-cam with the continuously-revolving pinion C, when the top end of the trip-lever is alternately moved from beneath the check-pins b projecting from the outer surface of the head stripper-cam; one of the arms which form a part of the stripper-carrying frame, and some of the other parts being also shown in this figure.

Figure 28:
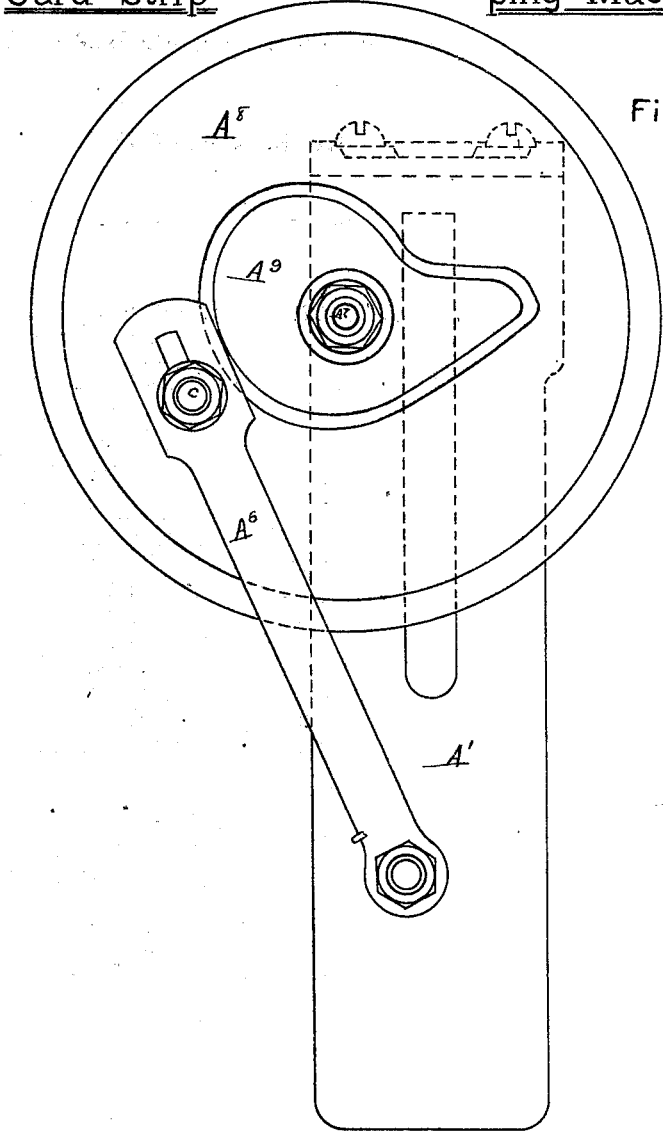

On sheet 12, Fig. 28 represents the same essential parts shown in Fig. 27, but in a different position, both the stripper and the incline cam being shown as having performed about one-half of a revolution or when the revolving incline cam is gradually pressing or forcing the upper end of the spring-actuated lever $A^6$ outward to its incline point of intersection and rest, preparatory to another action of the trip-lever D, as before described, the lower end of the lever $A^6$, and the actuating-spring being connected to the stripper carrying-arm at one end of the card.

This invention relates to certain improvements in machinery or apparatus for stripping the top flats of carding-engines, and for traversing the stripper-carrying frame from one side of the card to the other, by a single traversing mechanism at one end of the card, the independent stripping mechanism involving the necessity of an independent cross-shaft constituting a part of the same, and at intervals intersected or brought into operating contact with the driving-gear or pinion connected with the traversing mechanism, said intervals of connection being regulated and determined by the skip-wheel and the transfer-cam, as hereinafter described. The object of this invention is to furnish the requisite mechanisms and combinations of mechanisms or operating elements to be employed in connection with the stripper-carrying frame embraced in my former patent, whereby said frame in its traversing action or motion is arrested and locked at intervals against alternate top flats, and whereby the independent stripping mechanism is caused to strip or to omit to strip alternate or other top flats in any order desired at each forward and backward journey of the frame and the mechanism. Any number of the top flats or a series of top flats may be stripped or omitted. This invention consists of an improved traversing mechanism, and in connection therewith of a stripping mechanism, which determines and regulates the time and place or the periods of intersection or operating contact of the independent stripping mechanism with the continuously operating parts which perform the traverse and skip, the independent stripping mechanism forming an important part of the invention, and operating on parallel slides, and not on pivoted and swinging or oscillating levers, as in some other card-stripping machinery. In detail this invention also consists of a loosely-pivoted link, E, in combination with and carrying the traversing-cam B, arranged upon the inner end of a geared shaft, $B^1$, driven by a toothed pinion, the free end of the link or its hub forming a bearing for the cam-shaft, and the cam operating in connection with the pins or studs of the mangle-pin segment to traverse the stripper-carrying frame, and the connected and operating mechanism from one side of the card to the other, thus producing the necessary and very easy, smooth, and evenly-operating compound intermittent traversing motion by a continuously-rotating cam, and avoiding the usual pinion and set-plate which causes the mechanism to stop and start suddenly, and is liable to break the pins at the ends of its segment. This invention also consists of the traversing-cam, and the mangle-pin segment, each constructed as shown and described, the number of pins in the segment being always one more than half the number of top flats, so as to have half as many spaces between pins as there are top flats on the card; and the continuously-rotating cam, by the formation of its groove operating between any two pins and on either side of the curved row of pins at predetermined intervals, holds the stripper-carrying frame firmly at rest, while the independent stripping mechanism raises, strips, and replaces an alternate top flat, or while the mechanism, having passed an alternate, omits to strip the next, or a succession or a series or any number of top flats, as is determined by the skip-wheel and the trip-lever, the former operating the latter, as hereinafter described. This invention also consists of the skip-wheel F, which is clearly shown in Figs. 1, 2, 3, 4, 7, and 8 of the drawing. The skip-wheel, shown in Fig. 8, is intended to determine the time and the order of stripping a series of eighteen top flats. Those shown in the other figures are for a series of sixteen top flats, and each is imperfect in not having shown therein any central extension, G, or elongation of the teeth or spaces in the serrated or mangle slot, and which provides for passing the end pins on the segment.

In the skip-wheel shown in Fig. 8 these central extensions are prominent and clearly shown between teeth 1 and 2 on each side of the face of the wheel. These blank spaces also occur between 17 and 18 at each side of the wheel or at opposite quarters of the circle, and these blank spaces last named are reckoned into and formed in the long concentric groove H, between the points 9 and 18 at one side, and between the points 10 and 17 at the other side of the wheel. Each of the concentric grooves is of sufficient length to hold the trip-lever at rest, (the stud $a$ of said lever working in the groove,) while the stripping mechanism is traversed over eight top flats or four alternate top flats at the rear side of the card or next to the doffer, and also sufficient to allow the traversing-cam to pass the end pins of the segment.

The edge or periphery of the skip-wheel is provided with teeth, which are intersected by a screw or worm, I, arranged on the lower end of an inclined shaft, supported by a stand, $A^5$, projecting from the outside of one of the arms A. On the upper end of the worm-shaft is a bevel-gear, $v$, which meshes into a bevel-gear, $h$, arranged upon the shaft $m$ of the link E, which carries the traversing-cam B. Inside of the bevel-gear last named and adjoining it is a spur-gear, $g$, and outside of said bevel-gear a larger spur-gear, J, the latter meshing into and receiving motion from the driving-gear $f$ on the hollow driving-shaft K and the pulley $A^2$, and the former meshing into and driving the spur-gear $A^3$ on the outer end of the traversing cam-shaft and rotating the cam. The hollow driving-shaft K is arranged upon a stud, $e$, secured to and projecting outward from the head-end arm A, and this driving-shaft carries an operating pinion, C, beneath and intersecting at intervals with the teeth of the head-end strip-cam $A^4$.

The skip-wheel is driven by the worm I, and the traversing-cam by the gear $g$, and both by the connected train of gears, as described. While the traversing-cam performs one revolution the lower adjustable tripping-stud $a$ of the trip-lever D passes the distance or space of one point or tooth in the serrated or mangle groove of the skip-wheel, as from 1 to 3, or from 10 to 8, &c.; and in its passage the stud causes the upper end of the trip-lever to make two motions—one forward and one backward—to liberate or disengage itself from check-pins $b$ and $b'$, and allow the toothed rim of the head-end strip-cam to engage with its operating pinion beneath it, which occurs immediately after the top end of the trip-lever is liberated from contact with the outside check-pin. At this instant of engagement of the geared connection of the head-end strip-cam with its continuously-rotating pinion, the two strip-cams on the cross-shaft $A^7$ are caused to commence and perform one revolution, and while the traversing-cam holds the frame at rest one top flat is raised, the strip-card inserted beneath it and withdrawn therefrom, and the top flat let down or replaced on its seat in time, as the revolving head-end strip-cam brings the inner check-pin $b$ over and into contact with the top end of the trip-lever, held in position by the stud $a$, operating in the mangle-groove. The position of the traversing-cam as holding the frame at rest, and the position of the skip-wheel and of the trip-lever as the strip-cams are performing said revolutions for raising, stripping, and replacing the top flat, are all clearly shown in Fig. 3 of the drawing.

In Fig. 2 the position of the same parts last above described is represented with the trip-lever on the outside check-pin, and ready to be liberated when the stud $a$ passes the inner point of the mangle, and in this figure the traversing-cam is shown as in the act of moving the stripper-carrying frame preparatory to being brought to rest for the second stripping operation.

When the inner check-pin $b$ on the head-end strip-cam has been brought over and into contact with the top end of the trip-lever, as shown in Fig. 1, the top flat last stripped will have been seated and the traversing-cam will be holding the frame at rest, but ready and commencing to move the frame, and the lower stud $a$ of the trip-lever will be against and passing an outer point or tooth of the mangle-groove in the skip-wheel. The circuitous groove of the slowly-revolving skip-wheel soon moves the trip-lever stud outward or from the center of the wheel, (by the stud following the groove and passing an inner point or tooth,) and this swings the top end of the trip-lever outward or from the center of the head-cam, and moves it from beneath the inner check-pin, when the head-end cam moves slightly, (actuated by the lever $A^6$ and the incline cam on the tail-end strip-cam,) carrying the outer check-pin into contact with the top of the trip-lever, the traversing-cam still moving the frame, but ceasing to move it a little before the top of the trip-lever is liberated from the outer check-pin $b'$ by moving inward or toward the center of the head-cam, and this is done by the tripping-stud $a$ as it rises and passes an outer point or tooth in the skip-wheel groove. The position of the parts just previous to the last-named tripping operation are shown in Fig. 2, the gear of the head-cam ready to intersect with the pinion.

It will be observed that in the toothed rim of the head-end cam there is a blank space where there are no gear-teeth. This allows the pinion C beneath it to rotate while the strip-cam or cams are at rest, and while the trip-lever is alternately liberated from the check-pins, and also while the frame is traversed from one alternate top flat to another. As soon as the trip-lever is liberated from the outer check-pin the spring-actuated lever $A^6$ on the tail end of the card by its top stud or roller $c$ presses against the flange of the incline cam $A^9$ beginning to press about as shown in Fig. 27, and this moves the cross-shaft and the strip-cams, and brings the teeth of the head-cam at one side of the blank space into contact with the teeth of the continuously-rotating pinion below it, and the strip-cams receive their rotary motion and one revolution, as before described, and the inner check-pin is again brought over the top end of the trip-lever.

It may be well to state that when the mechanisms on the head end of the card are in the positions shown in Fig. 1 those on the tail end of the card are about in the position shown in Fig. 27; and when the mechanisms on the head end are in the position shown in Fig. 3 those on the tail end are about as shown in Fig. 28.

The roll or stud on the top end of the spring-actuated lever $A^6$ is adjustable by a slot in the latter, or this may be slotted at its lower end and pivoted and made adjustable there instead of at the top.

All these last-described parts and combinations—viz., the trip-lever D and its connections, the spring-actuated lever $A^6$, and the incline cam $A^9$, and the lifting and stripping mechanism, when used in connection with the stripper-carrying frame, and the single traversing mechanism form important parts of my said invention.

The stripping mechanism consists of a pair of compound lifting, stripping, and replacing cams $A^4$ and $A^8$, one a right-hand and the other a left-hand, and each a double cam or a cam within a cam, all of the operating flanges and grooves being on one side of the plate or disk, and both of these cams being arranged and secured to opposite ends of the cross-shaft $A^7$ applied to the upper ends of the stripper-carrying arms and a little below the upper cross-bar $G'$. Also of a lifting and replacing slide, $B^2$, applied to the upper part of each of the arms, which are slotted to receive them, and a strip-card or strip-board, $B^3$, supported upon and operated or carried by parallel slides $B^4$, working in grooved guides at a right angle with or across the arms A and $A^1$, both the lifting-slides and the parallel stripping-slides being operated by the flanged grooves in the inner sides of the lifting and stripping cams, which receive their intermittent rotary motion from the continuously-rotating pinion C, as before described.

It will be observed that the lifting and replacing slides are constructed each with an offset-flange or stud-supporting brace, $B^5$, and that the single stud or lifting-pin $C^1$ in each slide projects outward directly or nearly under the cross-shaft $A^7$, which admits of the lifting and replacing cams being constructed with both lifting and lowering sides alike, and equal and capable of operating on the pins to lift the slides with a drawing stroke, or by drawing the pins toward the center of the axis of each of the cams instead of pushing or bearing upon the pins by force exerted outward or from the center, as in some other card-stripping machines.

By moving the pins to raise the slides with an inward drawing stroke toward the center of the cam, constructed and arranged as shown and described, and with the lifting-pins under the cross-shaft, as also shown, the cam has the advantage of a much easier motion, less liability to wear or break the cam or the lifting-pins; and besides all this, the cam is at least two inches smaller in diameter than where the lifting-pins are arranged about one inch at either side of the lifting-line of the cam and the cam pushes outward on the pin, as in some other machines.

The lifting-line of the cam is represented by the dotted line 44 in Figs. 22 and 24. When the head-end cam of these two lifting-cams is intersected with its driving-pinion, and the two cams begin to lift the slides and a top flat, the pin $C^1$ of the slide will be in the position shown at 1 in Figs. 22 and 24, and when the slide and the top have been fully raised the pin will be in position 2, and close to the cross-shaft $A^7$, the cam having made about one-third of a revolution.

Here, it is well to state, the stripping-cams and the parallel stripping-slides come into action, said stripping-cams being the outer groove $B^6$ in each cam, or that which surrounds the inner or lifting and replacing cam, each parallel slide being furnished with an operating stud or pin, $C^2$, projecting outward and entering the outer groove.

When the pin of the lifting-slide is in position 1, the pin of the stripping-slide will be about at 1 in its outer groove, and when the lifting-pin is at 2 the stripping-pin will be at 2 in the outer groove, and ready to operate the slide, a top flat having been raised for stripping. The cam still rotating, and by revolving about one-third of a revolution the pins of the strip-slides are carried in the outer groove, from position 2 to $2\frac{1}{2}$, and from there to 3, which imparts to the stripping-slides two distinct motions—the first one forward and inserting the strip-card $B^3$ beneath the raised top flat, and the second, viz., as the pin moves from $2\frac{1}{2}$ to 3 backward and withdrawing the strip-card, the pin $C^1$ of the lifting-slide during the last-named third of a revolution of the cams being carried in the concentric portion $D^1$ of the inner cam-groove from position 2 to 3, and the slide and raised top flat being nominally at rest. The third and last-continued motion of about one-third of a revolution of the cams carries the lifting and replacing pins from position 3 to 4, and the pins of the strip-slides, at rest, from position 3 to 1 in the outer concentric groove $D^2$, and this movement of the cams and the lifting-slides by their pins lowers the stripped top flat onto its seat. The concentric portion $D^3$ of the inner cam-groove between position-pins 1 and 4 is to allow the cam-gear to gradually and intermittently approach and intersect with its driving-pinion, as the trip-lever is being disengaged from the check-pins, as before described, and this brings the lifting, stripping, and replacing mechanisms again into position for a second operation, after the stripper-carrying frame has been moved by the traversing mechanism to an alternate or other top flat, as before described.

The strip-card $B^3$ is connected to the parallel slides by adjustable stands or arms $C^7$, as clearly shown in Figs. 1, 2, 3, 4, 7, and 27. The top-flat raising and replacing slides, and the lifting and pressing lugs $c^3$ and $c^4$, and which lift and press the top flats down together, when raised, pass into a groove formed in each of the arms at the inner sides thereof, and the sides of these grooves hold the ends of the raised top flat against the action of the strip-card when it is inserted and withdrawn, and also guide the top flat upward while being lifted, and downward while being depressed, until it gets a bearing between two adjoining top flats unaided by the stationary pins or guides on the card frame or arches.

Figure 7:
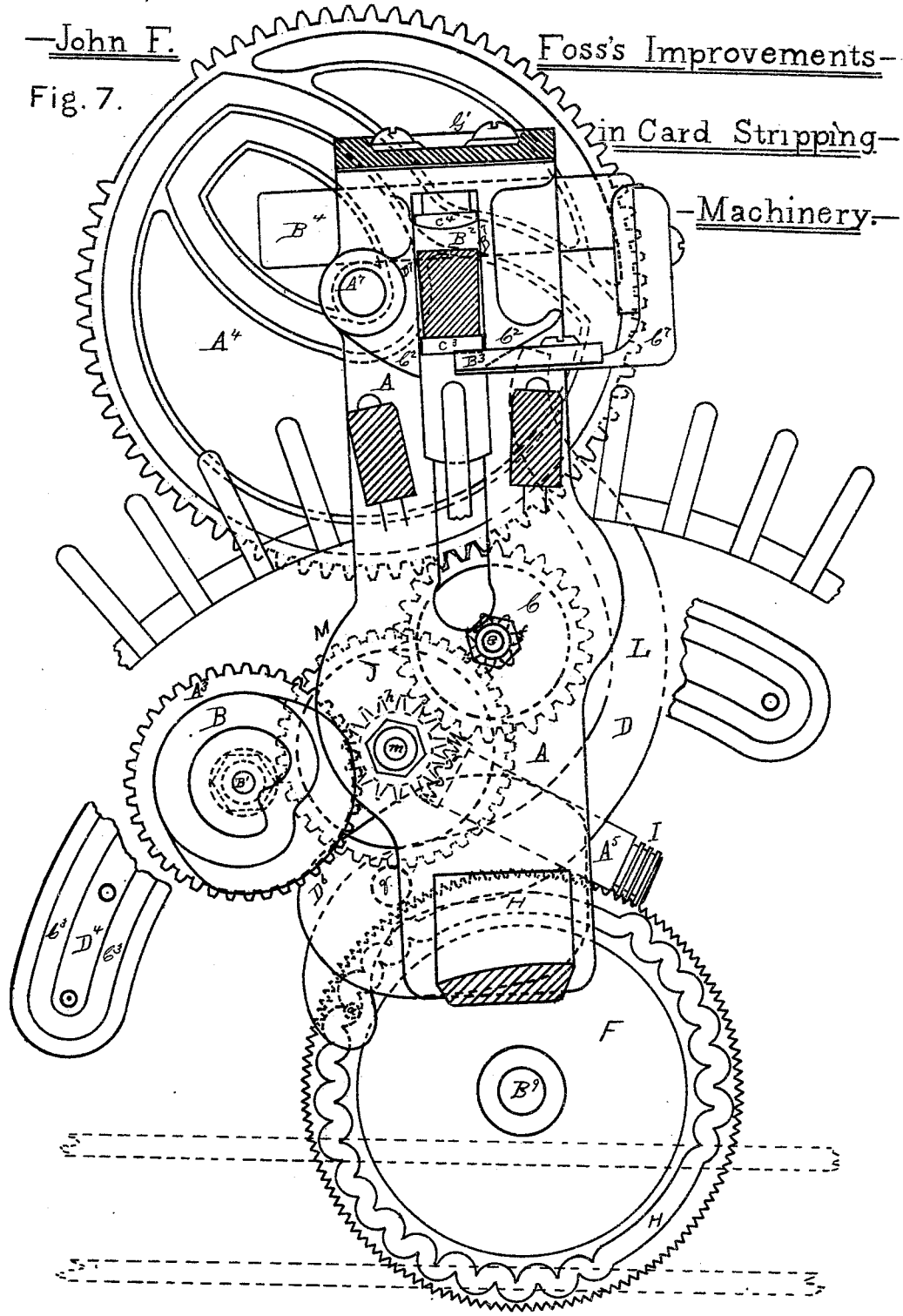

On the lower end of each of the projecting and strengthening flanges $B^7$, which form the guiding groove for the upward and downward moving top flats, I form an incline, $C^2$, as clearly shown in Fig. 7, for the purpose of pressing down any top flat, which may be raised above the adjoining ones by cotton or other substance interposed or caught beneath it, or otherwise elevated or left above the other top flats, said inclines acting to press such partially-raised top flats down when the stripper-carrying frame is moved by the traversing mechanism in either direction. The inclines $C^2$ greatly strengthen the flanges at each side of the top-flat guiding-groove, so that in their combined state these parts serve a threefold purpose, viz., to strengthen the arms and to guide the top flats, and to press down top flats which are partially raised. The parallel stripper-slides $B^4$ are applied to and reciprocate in grooved guides formed in the substance of and across the arms at the outside thereof, and opposite the top-flat guiding and strengthening flanges $B^7$.

In practice, and on a full-sized machine, the removal of the metal to form the said grooved guides for the strip-slides so weakens the arms at that place as to necessitate the application of the flanges which form the top-flat guiding-groove, and which are usually cast in one with each of the arms, and thus prevent the arms being broken, and make the said flanges serve a fourfold purpose, although originally intended only to strengthen the arms, but convenient to form the top-flat guiding-groove, as before described, and a connection for the top-flat pressing inclines.

In the application of some of the well-known top-flat stripping machinery to old cards, or to those which have been used and stripped by hand, there exists a necessity for the removal of the card clothing from all the top flats, the reapplication of the clothing and re-grinding of the teeth; and, besides all this, in applying such well-known strippers to the small number of—say one hundred old cards—there exists a further necessity of the removal, the slotting and the replacement and securing of the old metal end plates, or their removal, and the manufacture and application of new metal end plates to the under sides of the ends of all the top flats to the number of at least three thousand and six hundred of such iron end plates, besides other minor changes, all of which are entirely obviated by my improvement of the top-flat guiding-grooves, formed by the two strengthening-flanges $B^7$ on the arms of the stripper-carrying frame, as shown and described. In the present instance the skip-wheel is represented as applied to one end of the main cylinder shaft $B^9$.

In practice, the location of the skip-wheel is governed by the number of top flats, and the intended order of stripping, and the construction of said wheel and the diameter required to produce or provide for the requisite length of mangle-groove, and the length and number of blank spaces or concentric grooves between the serrated portions; as, for instance, (and referring to Fig. 8 of the drawing,) if the full size carding-engine has eighteen top flats to be stripped by the stripping mechanism applied, and where ten top flats at the front side of the card are to be stripped twice as often as the other eight, the skip-wheel will be precisely like that shown, except that it should be about twice the diameter, and such a skip-wheel is located and rotates on a stud projecting outward from the carrying-arm on the head end of the card. Assuming that the order of stripping is to be changed so as to strip six top flats at the front side, say once in fifteen minutes, and the next six top flats once in thirty minutes, and the six nearest the rear side of the card once in forty-five minutes, there would be a fourth division of concentric grooves, and two of the divisions would be longer than the other two, each of the larger concentric grooves covering twelve top flats, or being of sufficient length to allow the mechanisms to skip twelve top flats and also the end pin-reversing space, and each of the shorter concentric grooves covering or controlling the stripping of six top flats and the reversing-space, and such a skip-wheel would be about eighteen inches in diameter, which would necessitate its application to the outside end of the box of the main cylinder-shaft. An endless guiding-groove, $C^3$, surrounds the curved row of studs or pins projecting from the fixed cam-operating and traversing segment $D^4$, and the inner end of the cam-shaft runs in this groove and guides the cam at each side of the curved row and around the end pins. The spring-actuated lever $A^6$, which operates the incline-cam $A^9$ to intersect the gear of the head-end stripper-cam with its pinion, is pivoted to the arm at the tail-end of the card, and the spiral spring $C^4$, which actuates the lever, is wound or applied to the exterior of the hub thereof, one end of the spring being secured to the lever and the other end to the arm $A^1$, and the hub of the lever is supported by a stud projecting from the arm. The arm A at the head-end of the card is constructed with suitable edge-swells or projecting portions, L and M—the former to receive and hold the stud $e$, which carries the hollow driving-shaft K and its pinions, and the latter to support the stud $m$ of the link E, which carries the traversing-cam and its stud $B^1$ and driven gear $A^3$. This link-supporting stud $m$ also carries the cam-driving pinion $g$, the skip-wheel-driving beveled pinion $v$, and the outside driven gear J, which receives its motion from the small pinion $f$ on the hollow driving-shaft K. The bearing-stand $A^5$, which supports the worm I and its shaft, may be connected with the head-end arm A in any suitable manner. The driving-pulley $A^2$ on the hollow shaft K is for the application of a belt or band to drive the whole traversing and stripping mechanisms.

One important part of my invention is the top-flat-lifting, stripping, and replacing mechanisms, which are capable of being operated, with a greater or less degree of rapidity, by a simple change of the strip-pinion C, and substituting a larger or a smaller one, the lifting and replacing cams, and also the stripping-cams, by means of their peculiar construction, being capable of rapid rotary motion, and thereby of quickly raising, stripping, and replacing the top flat, and preventing the accumulation of cotton in the open space, which cotton, if allowed to accumulate in the space left open by any raised top flat suspended for any great length of time, is instantly transferred to the doffer on the replacing of such suspended top flat, causing a transverse enlargement or raised streak in the sliver, which is readily apparent all through the work, and which retards the warping and the weaving by the enlargements on the yarn crowding and chafing between the dents of the reed.

The simplified devices and combinations of devices which render the apparatus capable of skipping certain of the top flats and of stripping certain of the others more frequently are the means for diminishing the amount of stripping waste each day, and at the same time each card having my said improvements furnishes even and very superior sliver to the railway heads.

By reference to Figs. 1, 2, 3, 14, and 15 of the drawing, it will be observed that the operating-groove of the traversing-cam B is open at the concentric side R thereof, or between the points 7 and 8. The hub S furnishes the bearing-surface for the pins when between two of them, and holding the frame at rest, as represented in Figs. 1 and 3, and the opposite ends 7 and 8 of the outer flange P, as the cam revolves, engage and liberate the pins of the segment; that is, when the point 7 passes over and hooks onto a pin, (say pin 5,) the point 8 will be fully liberated from, say, pin 6, or another pin, as in Figs. 3 and 14. The cam, still rotating, draws itself onto the engaged pin, which may be pin 6, as in Fig. 2, or onto another pin, and this pin is brought into the eye X of the cam while in the act of traversing the frame from one top flat to the next, and carried from the eye to the point $e^2$ of the concentric surface while traversing to an alternate top flat, and the frame brought to rest and held, with the concentric surface of the cam revolving between two pins, as before stated.

The frame is traversed by the cam while rotating on a pin from point $e^1$ to $e^2$, and the other and concentric portion of the cam is appropriated for holding the frame at rest while the lifting, stripping, and replacing of each top flat are performed. In passing the end pins of the segment each of these pins rests in the eye X of the cam while the cam performs about one-half of a revolution, and this carries the inner guiding-end of the cam-shaft from the upper to the lower portion of the groove at one end, and from the lower to the upper portion of the groove at the opposite end of the segment. At this point, and having passed the end pin, the cam assumes its regular position on the opposite side of the curved row of pins and rotates, as before described.

It will also be observed that the loosely-pivoted link E, which carries the traversing-cam and its stud or shaft and gear $A^3$, allows the cam to pass around the end pins from one portion of the groove to the other and reverse the direction of traverse of the stripper-carrying frame, and this gives the cam the capacity of, or makes it, a positive reversing as well as a traversing device or mechanism.

The trip-lever D is arranged to swing or oscillate on a stud or pin, $q$, projecting from a stand, $D^6$, on the arm A.

I claim as my invention—

1. The single stationary segment $D^4$, constructed as described, and provided with the specified number of studs or pins, arranged as set forth and shown, so that the operating-groove of the cam or its bearing-surfaces, engaging with the pins, causes the stripper-carrying frame to move or traverse and to rest at intervals on both sides of the curved row of pins, for the purpose and in the manner substantially as described.

2. The traversing-cam B, constructed as described, and operating in connection with the pins of the segment, to pass the end pins and to cause the stripper-carrying frame to move or traverse and to rest at intervals, in the manner and for the purpose substantially as described.

3. The loosely-pivoted link E, in combination with and carrying the traversing-cam B and its shaft and gear, for the purpose of making said cam a reversing as well as a traversing mechanism.

4. The skip-wheel F, constructed to co-operate with the cam B and the segment, as described, in combination with and operating the trip-lever D to disengage it from the check-pins $b$ and $b'$ and allow the lifting, stripping, and replacing mechanism to be brought into action and to strip certain of the top flats, or to retain the trip-lever under the inner check-pin $b$ while the mechanisms pass and omit to strip certain of the other top flats in any order desired, substantially as described.

5. The head-end cam $A^4$, constructed as described, and provided with teeth on its periphery, and with check-pins $b$ and $b'$, operating in connection with the trip-lever to allow the spring-actuated lever $A^6$ to cause an intersection of the cam-gear teeth with its driving-pinion and bring the stripping mechanism into action, as described.

6. The combination of the independent lifting, stripping, and replacing mechanisms, consisting of the head and tail cams $A^4$ and $A^8$, the cross-shaft $A^7$, the lifting and replacing slides $B^2$, each provided with a pin, $c^1$, and an offset-brace, $B^5$, and lifting-lugs $c^3$ and $c^4$, the parallel strip-slides $B^4$, with arms or stands $C^7$, the strip-card $B^3$, the incline-cam $A^9$, the spring-actuated lever $A^6$, and the arm-strengthening flanges $B^7$, each provided with an incline, $C^2$, all constructed, arranged, and co-operating to lift, strip, and replace the top flats, in the manner and for the purpose substantially as described.

7. The flanges $B^7$ against the groove of the parallel strip-slides and inside of the arms, for strengthening the latter, and for other purposes, as described.

8. The inclines $C^2$, in combination with the flanges $B^7$, for the purpose of pressing down partially-raised top flats, as specified.

9. The lifting and stripping cams $A^4$ and $A^8$, constructed, as described, each with a continuous groove and a concentric intersecting groove or portion, $D^3$, in combination with and operating the lifting-slides and the parallel strip-slides to raise, strip, and replace the top flats, substantially as described.

10. The cross connecting-shaft $A^7$, so disposed, in relation to the stripper-carrying frame as to be carried by or traversed with the frame and connect the tail and head-end-strip cams, in combination with and causing the cams to co-operate in working the lifting-slides and the parallel stripping-slides, substantially as described.

In witness whereof I have hereunto set my hand this 6th day of June, 1871.

JOHN F. FOSS.

In presence of—
JOHN E. CRANE,
CHANNING WHITAKER.